United States Patent [19]

Tokoi

[11] Patent Number: 5,017,119
[45] Date of Patent: May 21, 1991

[54] CUTTING MEANS FOR UNDERWATER PELLETIZER

[76] Inventor: Lauri Tokoi, P.O. Box 500183, Houston, Tex. 77250

[21] Appl. No.: 503,767

[22] Filed: Apr. 3, 1990

[51] Int. Cl.$^5$ .............................................. B29B 9/06
[52] U.S. Cl. ............................ 425/142; 264/142 425; 425/311
[58] Field of Search ................. 425/311, 67, 142, 313, 425/315, 464; 264/142, 40

[56] References Cited

U.S. PATENT DOCUMENTS

| | | | |
|---|---|---|---|
| 2,286,405 | 6/1942 | Gordon | 264/142 |
| 2,432,734 | 12/1947 | Doesken | 425/311 |
| 3,292,212 | 12/1966 | Pomper | 425/311 |
| 4,179,255 | 12/1979 | Hale | 425/311 |
| 4,251,198 | 2/1981 | Altenburg | 425/311 |
| 4,300,877 | 11/1981 | Andersen | 425/311 |
| 4,569,809 | 2/1986 | Baggett | 264/40.1 |
| 4,663,099 | 5/1987 | Marven | 425/311 |
| 4,671,756 | 6/1987 | Bertolotti | 264/142 |
| 4,710,113 | 12/1987 | Voigt | 425/311 |
| 4,874,307 | 10/1989 | Comper et al. | 425/311 |

FOREIGN PATENT DOCUMENTS

| | | | |
|---|---|---|---|
| 15768 | 9/1980 | European Pat. Off. | 425/311 |
| 43-20765 | 9/1968 | Japan | 425/311 |
| 568546 | 8/1977 | U.S.S.R. | 425/311 |

*Primary Examiner*—Jay H. Woo
*Assistant Examiner*—William J. Matney, Jr.
*Attorney, Agent, or Firm*—Dodge, Bush, Moseley & Riddle

[57] ABSTRACT

An underwater pelletizer (10) has a hub or rotor (24) with a plurality of improved holder and blade assemblies (40) mounted thereon each having a blade (44) carried by a holder body (42). Holder and blade assembly (40) is mounted within an opening (34) defined by boss (32) projecting from hub (24) for relative cushioned movement against an elastomeric washer (62) between the holder and blade assembly (40) and the hub (24).

5 Claims, 2 Drawing Sheets 5,017,119

CUTTING MEANS FOR UNDERWATER PELLETIZER

BACKGROUND OF THE INVENTION

This invention relates to cutting means for an underwater plastic pelletizer, and more particularly to improved means for cutting and transferring plastic pellets from extruded plastic polymers.

Heretofore, such as shown in U.S. Pat. No. 4,300,877 dated Nov. 17, 1981 underwater plastic pelletizers have been provided in which hot plastic material extruded through the orifices of a die plate into a water filled housing are cut into short lengths or pellets by rapidly rotating knives adjacent a side of the die plate. The pellets are cooled by the water and carried from the water filled housing to a collection station.

A rotor is mounted adjacent a face of the die plate from which the plastic material is extruded and a plurality of circumferentially spaced cutting blades or knives are secured to a hub of the rotor for rotation therewith. The cutting edges of the blades normally ride along or in closely spaced relation to the surface of the die plate during rotation of the rotor. By including or tilting the blade at a tilt angle of around 45° for example with respect to the adjacent face of the die plate, a self sharpening cutting edge is provided as the cutting edge positioned at the same angle as the tilt angle. Also, a negative rake angle is provided so that a cut pellet is effectively pulled away from an extruded plastic strand. As the blades normally wear unevenly, the blades will not always be equally spaced from the die plate since mounted in a fixed relation on the rotor or rotor hub.

U.S. Pat. No. 4,251,198 dated Feb. 17, 1981 is likewise directed to an underwater thermoplastic pelletizer including a rotor hub with blades extending therefrom and having cutout portions between the blades. The blades are rigidly secured to the hub and have opposed cutting edges for reversal of the blades to provide a new cutting edge upon wear of the opposed cutting edge. The rotor and hub are normally urged toward the face of the die plate at a predetermined loading to urge the cutting edge into contact with the die plate. As the blades are fixed to the hub, an uneven wear will normally occur on the blades. The open areas of the hub in U.S. Pat. No. 4,251,198 in combination with the configuration of the blades permit the water and pellets in the underwater pelletizer to flow more freely to minimize vortexing of the water resulting from the centrifugal water flow generated by the rapidly rotating hub and blades.

As an example of a pelletizer in which the axial position of the rotor hub and blades thereon relative to the die plate may be controlled and maintained at a predetermined distance, reference is made to U.S. Pat. No. 4,529,370 dated July 16, 1985. A predetermined distance between the cutting blades and die plate is maintained by sensing the conductivity between the die face and cutter assembly carrying the blades which is imputed to a microcomputer for effecting axial movement of the cutter assembly or hub toward the die plate upon a wearing of the blades thereby to maintain a precise predetermined distance between the blades which are fixed to a hub and the die plate. The cutting edges of the blades are self sharpening.

SUMMARY OF THE INVENTION

The present invention is directed to an underwater plastic pelletizer and particularly to improved means for cutting and transferring plastic pellets from extruded plastic polymers. The improved cutting means includes a plurality of circumferentially spaced blades mounted on a hub for rotation with the cutting edges of the blades positioned on the rotating hub at a negative rake angle with respect to the axis of rotation and tilted at a tilt angle with respect to the surface of the die plate.

Each blade fits in a slot on an end of a holder which has a cylindrical shaft mounted within a receiving opening on the hub. Resilient means between the hub and the holder mounts each blade for axial movement relative to the hub toward and away from the surface of the die plate through which hot thermoplastic material is extruded. The longitudinal axes of the receiving opening and mounting shaft of each holder are inclined with respect to the axis of rotation an amount equal to the desired tilt angle of the cutting blade. The mounting shaft of the holder is fitted within the receiving bore or opening of the hub so that the cutting edge of the blade is positioned at the desired rake angle with respect to the axis of rotation. Cooperating alignment means on the holder and the hub mount the holder at the desired rake angle while permitting limited axial movement of the holder relative to the hub. A suitable resilient means such as Belleville or elastomeric washers are positioned between the holder and the hub to permit a limited resilient movement of the holder and associated cutting blade relative to the hub.

It is an object of this invention to provide improved cutting means for an underwater plastic pelletizer including cutting blades mounted on a rotor hub at a predetermined rake angle with respect to the axis of rotation and at a predetermined tilt angle with respect to the adjacent surface of a die plate.

It is a further object of this invention to provide such improved cutting means for an underwater pelletizer in which each of a plurality of circumferentially spaced blades is mounted on a hub for limited relative axial movement toward and away from the die plate.

It is an additional object of this invention to provide such improved cutting means for an underwater thermoplastic pelletizer in which a separate holder for each cutting blade is mounted on the hub for limited relative axial movement.

Other objects, advantages, and features of this invention will become more apparent after referring to the following specification and drawings.

DESCRIPTION OF THE INVENTION

Figure 1:
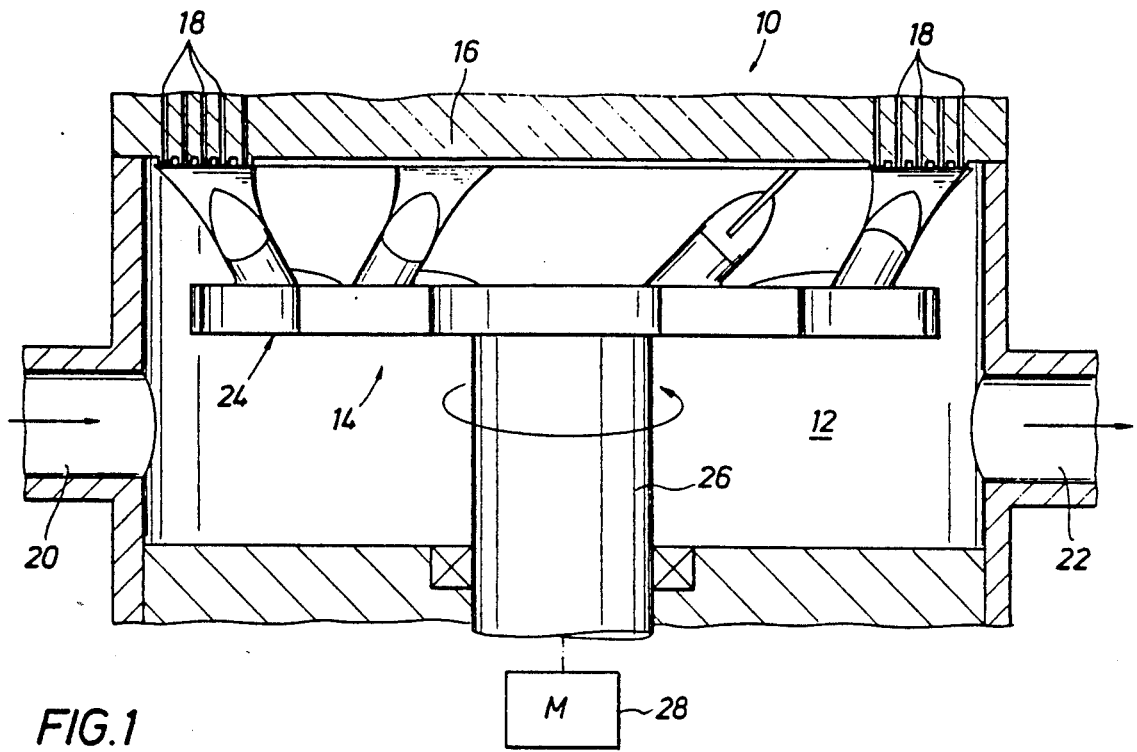
FIG. 1 is an enlarged section of a portion of an underwater pelletizer comprising the present invention including a hub having blades thereof positioned adjacent a die plate having orifices for the extrusion of plastic material for cutting by the blades.
Figure 2:
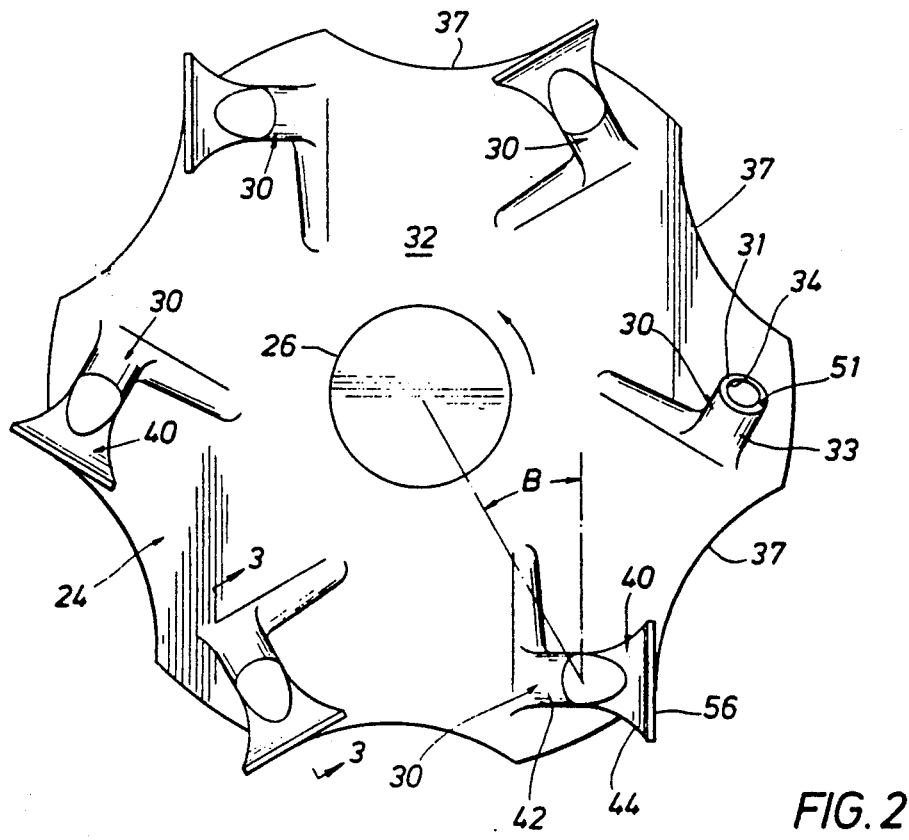
FIG. 2 is a top plan of the hub shown in the pelletizer of FIG. 1 with the blades mounted on holders removably mounted on the hub.

Referring now particularly to FIGS. 1 and 2, an underwater pelletizer is shown generally at 10 including a water-tight pelletizing chamber at 12 in which a rotating cutter assembly shown generally at 14 is mounted for rotation. A die plate 16 is shown adjacent cutter assembly 14 and includes a plurality of orifices 18 communicating with an extrusion cavity containing plastic with the hot plastic material being extruded through orifices 18 of die plate 16.

The water-tight chamber 12 has a water inlet shown at 20 and a water outlet shown at 22. Cutter assembly 14 cuts the plastic material extruded through orifices 18 into pellets which are then cooled by water in water-tight chamber 12 and discharged with the water from outlet 22 to a suitable receiving area. Cutter assembly 14 includes a rotor or hub generally indicated at 24 secured to a shaft 26 for rotation. A motor generally indicated at 28 is shown schematically for rotation of shaft 26.

Figure 3:
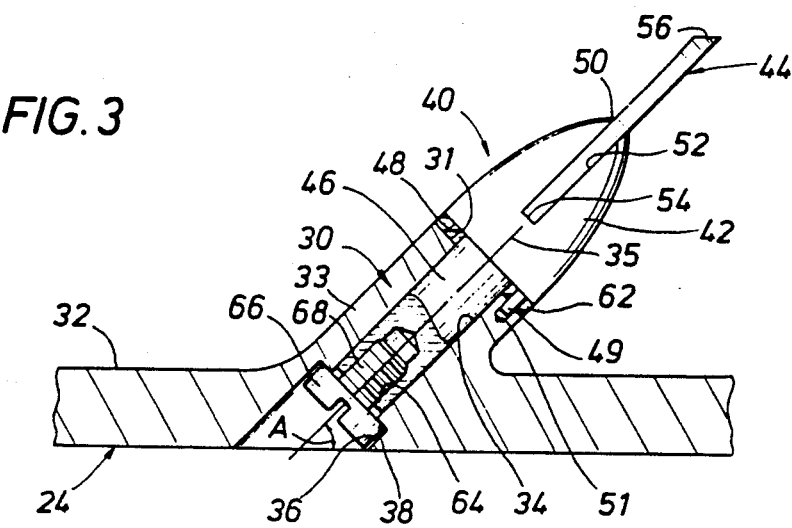
FIG. 3 is a section taken generally along line 3—3 of FIG. 2 and illustrating a portion of the hub showing a holder with the blade thereon mounted within the receiving opening or socket on the hub with the holder adapted for relative resilient movement.

Hub 24 has a plurality of blades mounted thereon for cutting the plastic material as it is extruded through orifices 18 in die plate 16. Hub 24 includes a plurality of sockets generally indicated at 30 which extend from the upper surface 32 of hub 24. Hub 24 is preferably formed of a cast metal and sockets 30 are cast with hub 24 to form bosses extending therefrom which are tapered as shown in FIGS. 2 and 3 into surface 32 of hub 24. Each socket 30 has a protuberance or boss shown at 33 in FIG. 3 having a central opening or bore 34 extending through hub 24 and defining an annular end shoulder or abutment 31. Opening 34 has its longitudinally extending axis 35 inclined at a 45° angle shown at A with respect to the axis of rotation of shaft 26. Opening 34 has an enlarged diameter end portion 36 formed by a countersunk portion of rotor 24. An annular shoulder 38 is formed at the juncture of enlarged diameter portion 36 with the remaining portion of opening 34. Hub 24 has a cutout portion 37 adjacent each socket 30 to provide an area for cut plastic pellets to drop past rotor 24 into chamber 12.

Mounted within each opening 34 is the improved holder and cutting blade assembly forming an important part of this invention and indicated generally at 40. Each assembly 40 includes a main body 42 having a blade 44 extending from one end thereof and a cylindrical supporting shaft or rod 46 extending from the other end thereof. Body 42 is of a generally cylindrical shape and forms an annular shoulder 48 about supporting rod 46 at its lower end and tapers outwardly therefrom in a generally symmetrical manner to its upper end shown at 50. An alignment or locating pin 49 extends from shoulder 48 and is adapted to fit within an opening 51 in annular shoulder 31 for positioning blade 44 in a predetermined position on hub 24.

Body 42 has a slot 52 extending transversely across its entire width from upper end 50 and defining a bottom at 54. Blade 44 has an extending cutting edge shown at 56 extending at an angle of 45° with respect to the longitudinal axis of supporting rod 46 to provide a self sharpening feature. Blade 56 has an opposite lower end 58 fitting against bottom 54 of slot 52 and tapered side edges 60 extending between edges 56 and 58. For securing blade 44 in slot 52, a thin soldering insert sheet or foil (not shown) is positioned about the portion of blade 44 fitting within slot 52 and an electrical current is applied for melting the soldering material between blade 44 and body 42 for securing blade 44 within the slot 52 upon cooling of the soldering material. Blade 44 may be removed from slot 52 for replacement or the like by reheating of the soldering material to a temperature of around 450° F. for example.

Blade 44 is of an optimum thickness of around 1/8 inch to provide a relatively thin blade with a small degree of resilience. A thickness of between around 1/32 inch to ¼ inch is believed to function satisfactory. Blade 44 may be formed of cobalt bearing alloys or a suitable tungsten carbide material. Blade 44 extends beyond body 42 for at least around one inch to provide a wear of one inch on blade 44 before replacement. While end 56 is shown at a 45° angle with respect to the longitudinal axis of rod 46, it is believed that an angle of between around 30° to 60° would function satisfactory. Likewise, while the longitudinal axis of opening 34 and supporting rod 46 as shown in FIG. 3 is arranged at an angle A of 45° with respect to the rotational axis of shaft 46, it is believed that an angle A from between around 30° to 60° would function adequately. Further, the negative rake angle of blade 44 or cutting edge 56 as shown in FIG. 2 is arranged at 30° as shown by angle B in FIG. 2, it is believed that a negative rake angle B relative to the radial axis of shaft 26 would function adequately between around 15° and 45°.

Figure 4:
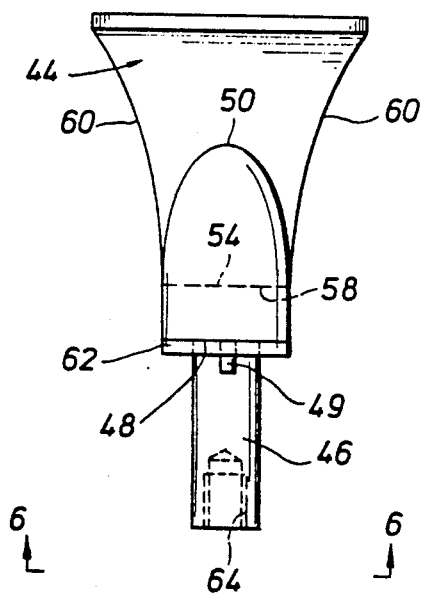
FIG. 4 is a front elevation of the holder with the blade thereon removed from the hub.
Figure 5:
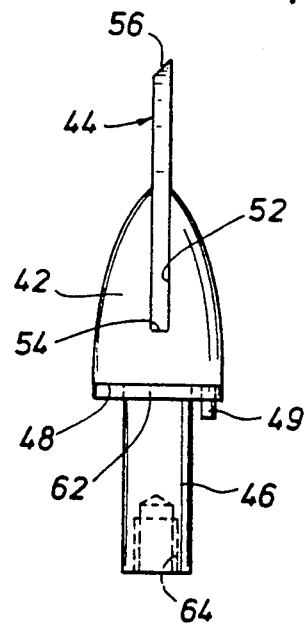
FIG. 5 is a side elevation of the holder and blade shown in FIG. 4.
Figure 6:
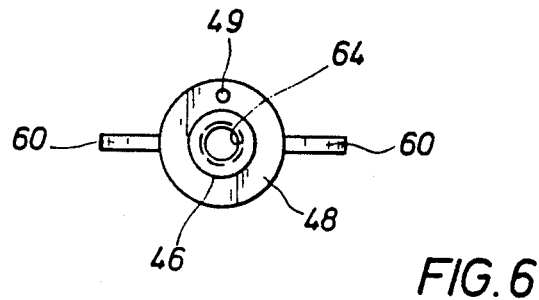
FIG. 6 is a bottom plan taken generally along line 6—6 of FIG. 5 and showing the holder.

For mounting blade assembly 40 on hub 24 as shown in FIG. 2, an elastomeric washer shown at 62 in FIG. 4 is first fitted about supporting rod 46 and receives locating pin 49. Then, rod 46 is inserted within opening 34 with washer 62 in abutting engagement with annular shoulder 31 on boss or protuberance 33 and locating pin 49 received within opening 51. Supporting rod 46 has an internally threaded end bore 64. A bolt 66 having an externally threaded end 68 is threaded within end bore 64 and its head abuts annular shoulder 38 to draw assembly 40 tightly against elastomeric washer 62. Thus, blade assembly 40 is mounted for limited cushioned movement relative to rotor or hub 24. Washer 62 is of sufficient size to provide an optimum cushioned movement of holder 40 of around 0.0025 inch. It is believed that a cushioned or resilient movement of between around 0.0001 inch and 0.005 inch would function satisfactory.

While elastomeric washer 62 is shown in the drawings as providing relative cushioned movement of assembly 40, it is understood that other types of mountings for assembly 40 could provide relative cushioned movement. For example, a Belleville washer could be utilized in lieu of an elastomeric washer 62.

By mounting cutting edges 56 of blades 44 at a negative rake angle, blades 44 assist in the pulling of the plastic pellets from orifices 18. Blades 44 may be operated in contact with die plate 16 or may be slightly spaced from die plate 16, if desired. Shaft 26 and hub 24 secured thereto are normally mounted for longitudinal movement relative to die plate 16 to maintain a desired frictional contact between blades 44 and die plate 16, or to maintain a finite spacing therebetween. This may be controlled, for example, by sensing means to sense the distance between the knife blades and the die face by measurement of a decrease in the electrical conductivity between the die plate and the blades and then utilizing a microcomputer for longitudinal movement of shaft 26, such as by a stepping motor or the like, to the desired position. Other means, such as by measuring the torque resistance of rotating shaft 26 resulting from contact of blades 44 against die plate 16 by sensing means at the drive motor can likewise result in the desired spacing or the desired frictional contact between blades 44 and die plate 16, as well known in the art.

The utilization of a generally symmetrical holder and blade assembly mounted for relative cushioned movement on a hub provides a smooth cutting action and minimizes any vibratory effect on blades 44 resulting from operation of the assembly against the die plate. A relative thin blade 44 is provided less than around ¼ inch in thickness and preferably around ⅛ inch to maintain a relative sharp cutting edge 56 with blade 44 projecting around 1 inch above body 42 of assembly 40 so that an inch of wear is provided for blade 44 before replacement thereof. Blade 44 may be easily replaced by removal of assembly 40 from hub 24.

While the present embodiment as shown in the drawings utilizes a hub having a shaft extending in an opposed relation to the die plate, it is understood that the present invention may be utilized with an embodiment in which the rotating shaft is received by the die plate with the shaft extending in a direction opposite that shown in FIG. 1. Thus, the shaft for rotating the hub may be positioned on either side of the die plate as may be desired.

While a preferred embodiment of the present invention has been illustrated in detail, it is apparent that modifications and adaptations of the preferred embodiment will occur to those skilled in the art. However, it is to be expressly understood that such modifications and adaptations are within the spirit and scope of the present invention as set forth in the following claims.

What is claimed is:

1. In an underwater pelletizer having a die plate with orifices for the extrusion of plastic material, and a water chamber adjacent the die plate having an inlet and an outlet;

an improved cutter assembly positioned in the chamber adjacent the die plate for cutting plastic material extruded through the orifices, said improved cutter assembly comprising:

a small diameter shaft having an extending end thereof adjacent said die plate and adapted for rotation;

an increased diameter hub mounted on said end of said shaft for rotation about a longitudinal axis and positioned adjacent an outer face of the die plate;

said hub including a plurality of integral raised bosses extending from said hub toward said die plate and spaced circumferentially about said hub with each boss defining a central opening having a longitudinal axis extending toward said die plate at an inclination of between around 30° and around 60° with respect to the axis of rotation of said shaft;

an elongate blade and holder assembly mounted on each boss and including a straight support rod received within the central opening of the associated boss, and a blade mounted on said holder and extending outwardly therefrom to provide a cutting edge for said die plate, the longitudinal axes of said opening and said blade and holder assembly being axially aligned; and means removably securing each blade and holder assembly within the central opening of the associated boss.

2. In an underwater pelletizer as set forth in claim 1 wherein said blade has a negative radial rake and the longitudinal axis of said support rod is at an angle between around 30° and 60° relative to the rotational axis of said shaft.

3. In an underwater pelletizer as set forth in claim 1 wherein said hub includes a plate with the bosses extending from the plate, said central opening in said boss extending through said plate, and a removable fastener is positioned within said central opening extending through said plate for engaging the end of said support rod to secure the support rod within said central opening.

4. In an underwater pelletizer as set forth in claim 3 wherein resilient means are positioned between each boss and the associated blade and holder assembly to mount each blade and holder assembly for a limited axial movement relative to said hub and the associated boss, said removable fastener urging said blade and holder assembly against said resilient means.

5. In an underwater pelletizer as set forth in claim 1 wherein an elastomeric washer is positioned about said support rod in abutting contact with the extending end of the associated boss, and an adjustable fastener is positioned between the hub and extending end of the support rod for each blade and holder assembly for securing the blade and holder assembly within said central opening of said boss and for drawing said blade and holder assembly tightly against said resilient washer.

* * * * *